July 22, 1952     J. A. GILMARTIN     2,603,783
EYESHADE
Filed Oct. 18, 1948     2 SHEETS—SHEET 1
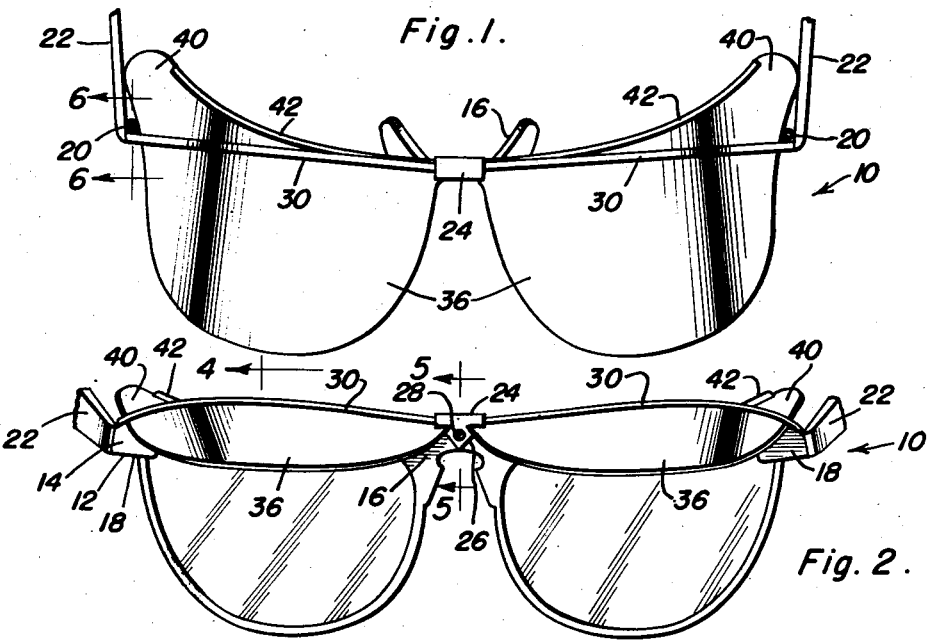
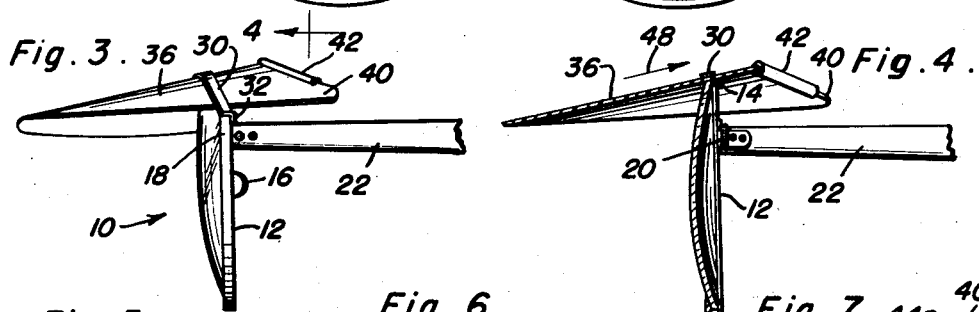
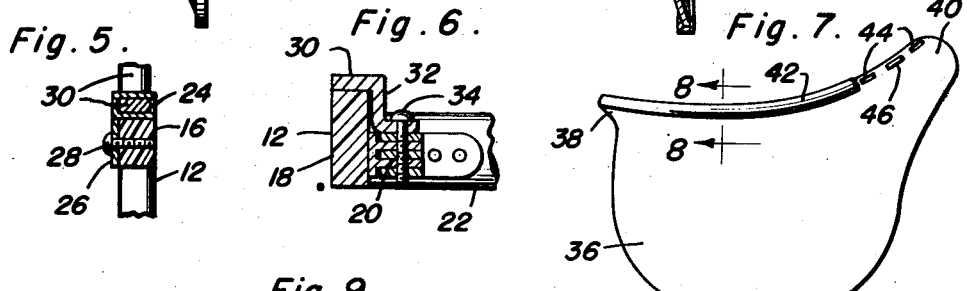
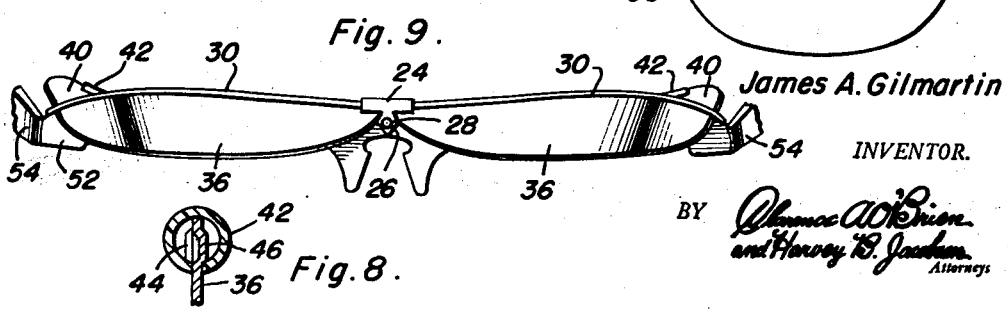
James A. Gilmartin
INVENTOR.

July 22, 1952     J. A. GILMARTIN     2,603,783
EYESHADE
Filed Oct. 18, 1948                         2 SHEETS—SHEET 2
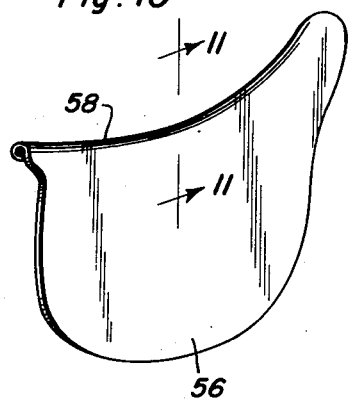
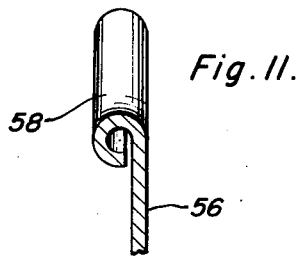
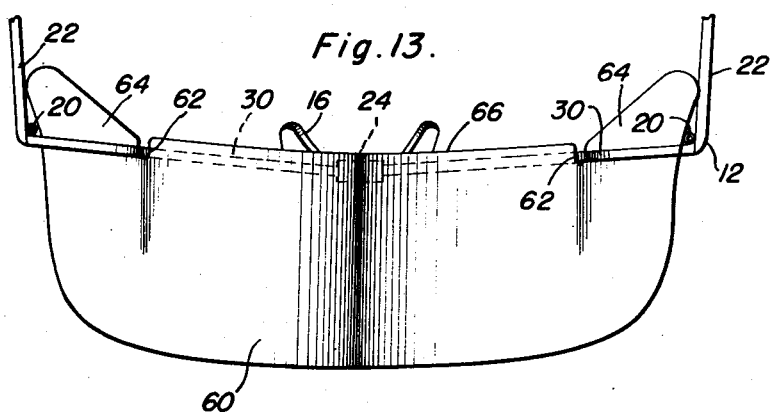
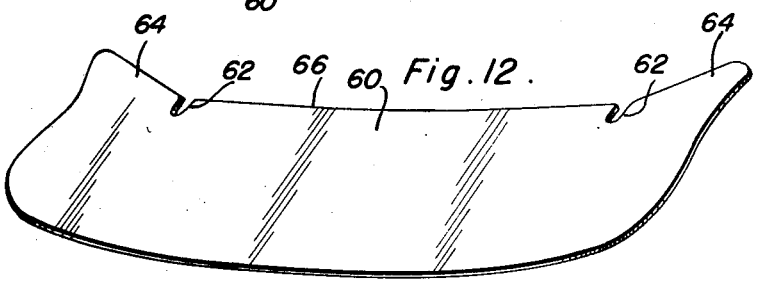
*Inventor*
James A. Gilmartin
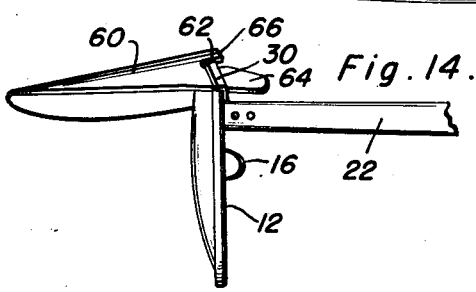
*Attorneys*

Patented July 22, 1952

2,603,783

UNITED STATES PATENT OFFICE 2,603,783

EYESHADE

James A. Gilmartin, Scranton, Pa.

Application October 18, 1948, Serial No. 55,095

2 Claims. (Cl. 2—12)

This invention relates to new and useful improvements and structural refinements in eyeshades, and the principal object of the invention is to associate eye shading members or panels with frames of eye glasses or frames similar to eye glass frames, so that the eye shades may be easily and conveniently worn.

In particular, the invention is an improvement on the subject matter of my U. S. Patent No. 2,286,269, granted on June 16, 1942. While experimenting with eye shades constructed in accordance with the teachings of this patent, I found that the same lends itself to certain structural and functional improvements, and it is, therefore, another object of the instant invention to embody such improvements in the eye shade herein described.

An important feature of the invention resides in the provision of means on the eye glass or spectacle frame, or the like, for removably retaining the shading panels in position, matters being so arranged that the retaining means themselves are easily removable from the spectacle frame, if so desired.

An additional feature of the invention lies in the provision of improved means for preventing the shading panels from accidentally or unintentionally dropping from the frame, or becoming otherwise displaced.

An important advantage of the invention lies in the simplicity of construction, in its pleasing appearance, and in its adaptability to economical manufacture.

With the above more important objects and features in view and such other objects and features as may become apparent as this specification proceeds, the invention consists essentially of the construction and arrangement of parts as shown in the accompanying drawings in which:

Figure 1 is a top plan view of the invention, partially broken away;

Figure 2 is a front elevational view thereof;

Figure 3 is a side elevational view of the same;

Figure 4 is a cross sectional view, taken substantially in the plane of the line 4—4 in Figure 2;

Figure 5 is a cross sectional view, taken substantially in the plane of the line 5—5 in Figure 2;

Figure 6 is a cross sectional view, taken substantially in the plane of the line 6—6 in Figure 1;

Figure 7 is a top plan view of one of the shading panels used in the invention, the same being partially broken away to reveal its construction;

Figure 8 is a cross sectional view, taken substantially in the plane of the line 8—8 in Figure 7;

Figure 9 is a front elevational view of a modified embodiment of the invention;

Figure 10 is a perspective view of a modified shade panel;

Figure 11 is a cross-sectional view taken substantially in the plane of the line 11—11 in Figure 10;

Figure 12 is a perspective view of a further modified shade panel;

Figure 13 is a top plan view of the invention embodying the panel shown in Figure 12; and, Figure 14 is a side elevational view of the subject shown in Figure 13.

Like characters of reference are employed to designate like parts in the specification and throughout the several views.

Referring now to the accompanying drawings in detail, the invention consists of an eye shade designated generally by the reference character 10, the same embodying in its construction a spectacle frame 12 of any conventional type, including a transverse upper member 14 having a nose portion 16 and a pair of end portions 18, the end portions 18 being provided with the usual hinges 20, to facilitate connection of side pieces or temple pieces 22 to the transverse member 14, as will be clearly apparent.

The invention resides in the provision of an open ended, flattened tubular socket 24 equipped with a mounting bracket 26 whereby it may be firmly secured by means of a suitable screw, or the like, 28 to the nose portion 16 of the frame member 14, as is best shown in Figure 5.

A pair of bendable, more-or-less resilient retaining straps 30 are angulated at one end thereof as at 32 (see Figure 6) and each strap is attached by its angulated portion to one of the aforementioned hinges 20 through the medium of the associated hinge pin 34.

The straps 30 are arcuated so as to more-or-less conform to the upper edge of the frame member 14, and the remaining, that is, the free end portions of the straps are removably insertable in the socket 24 on the nose portion 16.

If desired, the portions of the straps 30 in the sockets 24 may be intended to overlap, whereby straps of standard length may be employed in association with spectacle frames of different widths, as will be clearly apparent.

In any event, shading panels 36 of translucent material and configurated substantially as shown in Figure 7 are receivable between the straps 30 and the transverse frame portion 14, the panels 36 possessing sufficient flexibility so that they may be arcuated in conformity with the upper edge of the frame member 14, as will be clearly apparent. The panels 36 project forwardly through the spaces or slots which are formed between the strips 30 and the frame member 14 when the panels are inserted in position, and it is to be noted that the rear portions of the panels 36 are provided with lateral protuberances 38, 40. The protuberances 38 are disposed immediately adjacent the nose portion 16 of the spectacle frame, while the protuberances 40 are intended to extend laterally and rearwardly to engage the forehead and temples of the wearer. This feature, in itself, is sufficient to prevent light from entering the wearer's eyes through spaces between the spectacle frame and the forehead of the wearer, but the protuberances 40 also perform an additional function, namely that of preventing the panels 36 to slide outwardly, that is, forwardly with respect to the spectacle frame.

This forward sliding of the panels 36 is further prevented by the resiliency of the straps 30 which frictionally engage the panels and thereby tend to retain the latter in position.

In addition, the invention contemplates the provision of further means for preventing forward sliding of the panels 36, these means assuming the form of longitudinally split, tubular keepers 42 which are affixed to the rear edges of the panels 36 in the manner hereinafter described and prevents the panels from sliding forwardly.

It will also be apparent that these keepers 42, being of a tubular configuration provide rounded edges to engage the forehead of the wearer, in place of sharp, square edges such as would be otherwise presented by the panels 36 themselves.

The keepers 42 are secured in position on the panels 36 by providing the panels with rows of alternately arranged upward and downward depressions 44, 46 respectively (see Figures 7 and 8), whereby the split tubular keepers 42 may be "threaded" longitudinally on the rear edges of the panels 36 and the depressions 44, 46 will effectively retain the keepers in position.

As will be clearly apparent from the foregoing, the eye shade attachment may be readily adjusted to accommodate spectacle frames of various sizes and types, and if desired, the entire attachment may be removed from the spectacle frame upon removal of the hinge pins 34 and the screw 28. The shading panels 36 may, of course, be removed from the attachment by simply sliding the panels rearwardly, that is, in the direction of the arrow 48 in Figure 4.

The accompanying Figure 9 illustrates a modified embodiment of the invention which is similar to the embodiment 10, but in place of the aforementioned spectacle frame 12, this modified embodiment utilizes merely the upper transverse frame member and hinged temple pieces 54, being devoid of lens-receiving portions and lenses, and being intended solely to carry the eye shade attachment.

Figures 10 and 11 illustrate a modified shade panel 56 which is similar to the panel 36 but is formed with a rolled rear edge 58 in place of the already described keepers 42.

Finally, Figures 12, 13 and 14 show a further modified embodiment of the invention, utilizing only one long shade panel 60 in place of two of the panels 36, the panel 60 being formed in the rear edge portion thereof with a pair of notches 62 which enable the end portions 64 of the rear edge to be inserted under the aforementioned straps 30 while an intermediate portion 66 of the rear edge overlies the straps 30 and the socket 24, substantially as shown. By virtue of this arrangement the panel 60 is flexed, so to speak, and is frictionally retained in position on the spectacle frame.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. An attachment for an eye glass frame including a nose piece and a pair of arched members extending laterally from said nose piece, comprising a substantially rectangular socket adapted to be positioned on said nose piece, said socket having open ends, a bracket depending from said socket, a fastening element for securing said bracket to the nose piece, a pair of resilient straps adapted to be positioned on said arched members, the inner end portions of said straps being disposed in said socket and said straps lying in superposed relation on said arched members, and a pair of shade panels positioned between said members and said straps and frictionally retained in position by the latter, said panels projecting forwardly of said frame.

2. The device as defined in claim 1, wherein rear edge portions of said shade panels are provided on upper and lower surfaces thereof with rows of detents, and a pair of split tubular guards positioned on said rear edge portions and enclosing said detents, said guards being engageable with rear surfaces of said arched members to prevent forward shifting of said panels between said members and straps.

JAMES A. GILMARTIN.

REFERENCES CITED

The following references are of record in the file of this patent:

UNITED STATES PATENTS

| Number | Name | Date |
|---|---|---|
| 733,721 | Little | July 4, 1903 |
| 779,340 | Wynkoop | Jan. 3, 1905 |
| 1,452,305 | Mahoney | Apr. 17, 1923 |
| 1,528,282 | White | Mar. 3, 1925 |
| 1,879,216 | Hannan et al. | Sept. 27, 1932 |
| 2,286,269 | Gilmartin | June 16, 1942 |